(No Model.)
J. A. GREGG.
MILLING MACHINE.
No. 390,164. Patented Sept. 25, 1888.
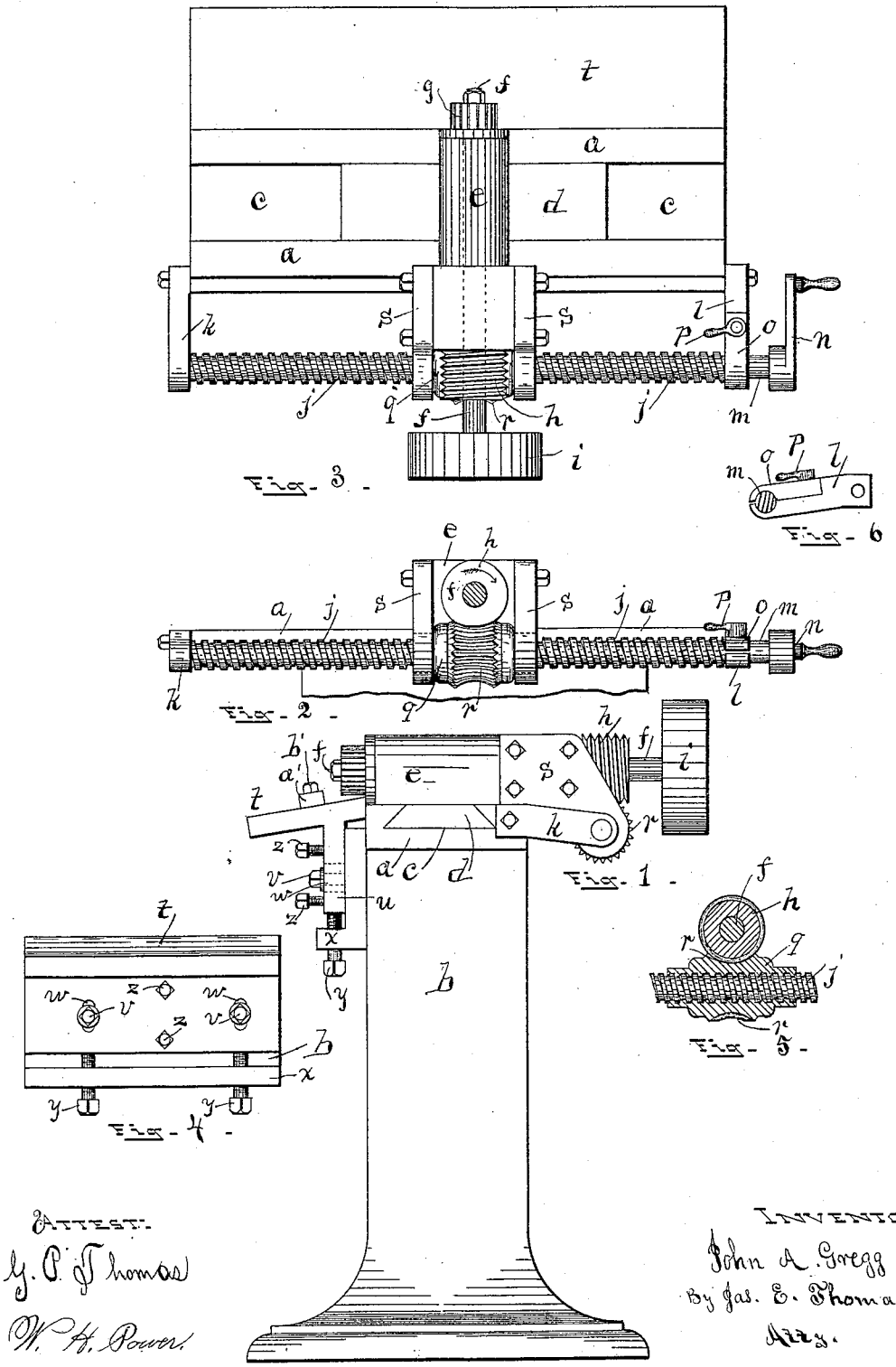

United States Patent Office.

JOHN A. GREGG, OF BAY CITY, MICHIGAN, ASSIGNOR TO AMOS S. PARKE, OF SAME PLACE, AND SYLVANIS S. MITTS AND WILLIAM MERRILL, BOTH OF EAST SAGINAW, MICHIGAN.

MILLING-MACHINE.

SPECIFICATION forming part of Letters Patent No. 390,164, dated September 25, 1888.

Application filed December 31, 1887. Serial No. 259,463. (No model.)

*To all whom it may concern:*

Be it known that I, JOHN A. GREGG, a citizen of the United States, residing at Bay City, in the county of Bay and State of Michigan, have invented certain new and useful Improvements in Milling-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in milling-machines, and especially to the feeding devices which are designed for carrying the cutter forward to the work or the work to the cutter; and the invention is particularly adapted for light work—such as milling the ends of band-saws, bolt-heads, nuts, &c—and for feeding other light machines requiring a slow and positive feeding movement.

The invention consists, chiefly, in the combination, arrangement, and construction of the devices employed, as I hereinafter set forth more fully, and especially point out in the claims.

One of the objects of my invention is to provide a cheaper and more easily constructed and more simple machine for milling and a machine which requires no skilled workman to adjust and operate.

A second object of my invention is to provide feeding devices for milling and other machines requiring slow and positive feed movements, which will operate to feed the tool forward at the required slow speed and will permit the cutter to be moved backward at a much greater speed without extra mechanism.

I attain these objects by means of the devices illustrated in the accompanying drawings, in which—

Figure 1 is an end view, in elevation, of a milling-machine for scarfing the ends of band-saws and with my improvement embodied therein. Fig. 2 is a front view of the upper portion of the same. Fig. 3 is a top or plan view of the same. Fig. 4 is a view of the rear side of the table and showing the mode of attaching the same to the machine. Fig. 5 is a longitudinal section of the feeding-nut. Fig. 6 is a view of the screw clamping device detached.

*a* represents a base-plate, which is secured to and supported by a column, *b*, and is provided in its upper surface with a groove, *c*, having the edges of the groove of a dovetail form, and *d* is a carriage fitted into the groove *c* and provided with edges fitting the edges of the groove.

Upon the upper portion of the carriage *d* and transversely with the groove *c* is arranged a raised portion or box, *e*, longitudinally through which is passed the arbor *f*, and just outside of one end of the box *e* is placed a rotary cutter, *g*, and upon the arbor, at the opposite end of the box, is mounted a worm-wheel, *h*, and upon the other end of the arbor is mounted and secured a pulley, *i*, to which motion is to be imparted by a belt driven by some suitable motor; or in place of the pulley *i* a crank may be substituted and the cutter-arbor actuated by hand-power.

Lengthwise of the bed-piece *a*, and upon the front side thereof and beneath the worm-wheel *h*, is placed a screw, *j*, the ends of the screw being journaled into the brackets *k* and *l*, which are bolted to the ends of the bed-plate *a*, and one of the journals *m*, extending beyond the bracket *l*, is provided with a square portion, upon which a crank, *n*, is secured, and the bracket *l* is provided with a cap-piece, *o*, through which and through the bracket is passed a bolt provided with a lever-nut, *p*, for holding the cap in position and for tightening the cap upon the journal, which prevents a rotary motion of the screw *j* when desired.

*q* is a nut of cylindrical form having a central opening through its length and provided with a screw-thread and passed upon the screw *j* and engaging with the screw-thread thereon, and upon the central portion of the nut is arranged a worm-gear, *r*, the teeth of which intermesh with the thread on the worm-wheel *h*, the nut being located beneath the worm-wheel and secured in position by the brackets *s s*, which are secured upon each side of the box *e*, and have their outer ends provided with openings, through which passes the screw *j*, and the brackets then rest against the opposite ends of the nut and allow a free rotary movement of the nut, but prevent any movement endwise thereof in relation to the worm-wheel and the cutter-arbor in either direction.

Upon the side of the machine opposite the screw $j$ is placed a bed or table, $t$, the table being somewhat inclined and provided with an apron or vertical portion, $u$, resting against the side of the column $b$, and secured thereto by bolts $v$, which pass through slots $w$, formed in the apron and into the column.

Below the apron are arranged the lugs $x$, projecting outwardly from the column, and the screws $y$ are passed through the lugs and have their ends resting against the lower edge of the apron, which provides a means of accurate vertical adjustment of the table $t$ relative to the cutter $g$, and one or more set-screws, $z$, are passed through the apron, and with their inner ends bearing against the column furnish a tilting adjustment of the table and give more or less incline to the table, as desired.

The operation of the devices is as follows: Power being applied to revolve the arbor in the required direction, (which in this case is in the direction indicated by the arrow in Fig. 2,) the worm-wheel $h$ revolves with the arbor, and engaging with the worm gear-wheel $r$ operates to revolve the nut $q$, and the nut engaging with the thread upon the screw $j$ revolves the screw when the journals thereof are free and no means are applied to prevent the screw from revolution; but when the screw $p$ is tightened and the cap-piece closed upon the journal $m$ the screw is then held rigid, and the nut $q$ then revolves upon the screw and the carriage $d$, and cutter $g$ is forced forward toward its work, and the forward movement thereof is arrested by releasing the bolt $p$ and freeing the screw from detention. The screw then revolves, and the forward movement of the carriage and the cutter is stopped.

The carriage may be moved in either direction very rapidly by operating the crank $n$ to revolve the screw $j$, so that when the screw $p$ is tightened and the carriage is forced forward until the cutter has passed over the work the screw $p$ is then loosened and the screw $j$ is revolved by the crank $n$ to quickly return the carriage to its original position preparatory to making another cut.

The machine, as herein shown and described, is arranged for milling the ends of band-saws and forming thereon suitable beveled surfaces, which, when lapped upon and brazed to each other, form a true and even joining of the plate, and the operation is that the saw-plate is clamped upon the table $t$ by a bar, $a'$, and screws $b'$, and the table, being somewhat inclined in relation to the cutter, places the saw at an angle with the cutter, the angle being slightly changed, if desired, by the set-screws $z$, and the height of the plate is adjusted in relation to the cutter by the screws $y$ to form the desired width of bevel upon the plate, the screw $j$ being operated by the crank $n$ to bring the carriage and the cutter to the proper position at one edge of the clamped plate. The screw $p$ is then tightened and the screw $j$ held rigid. The revolving cutter then moves forward and passes over the end of the saw-plate presented thereto and forms the required bevel thereon.

The cap $o$ and screw $p$ are herein shown as a means of clamping the journal $m$ for holding the screw $j$ rigid in its bearings; but I do not confine my invention entirely to this special arrangement, as various devices can be applied for retaining the screw against revolution; nor is the location and securing of the several devices and elements at all essential to the working and operation of the device, as the several parts may be located in other positions and operate with equal perfection and with the same result.

The advantages gained by this machine are that the working parts are few and its construction simple, and it is easily operated or adjusted by an unskilled workman, and the feeding device forms a cheap and effective movement for various machines which require a slow and positive feed.

Having fully described my improvement, what I claim as my invention, and desire to secure by Letters Patent, is—

1. In a milling-machine, the combination, with the base-plate provided with a longitudinal groove having overhanging edges, a carriage fitted into the groove and provided with a raised box lying at right angles with the groove, a cutter-arbor journaled in the said box and carrying a rotary cutter and a worm-wheel, and a feeding-screw placed at right angles with the said cutter-arbor and journaled at its ends in supporting-brackets, of a cylindrical nut provided with a threaded central longitudinal opening and passed upon the said screw, and having on its periphery worm-gear teeth engaging with the said worm-wheel upon the arbor, and retained in position by brackets, as $s$, projecting from the said carriage, substantially as and for the purpose set forth.

2. In a milling-machine, the combination, with a cutter-arbor journaled upon a suitable carriage and provided with a worm-wheel, of a cylindrical nut secured below the said arbor and having through the center of its length a threaded opening and provided on its periphery with worm-gear teeth engaging with the thread of the said worm-wheel, and a feeding-screw passed through the said threaded opening of the nut and journaled by its ends to supporting-pieces extending from the machine bed-piece, substantially as and for the purpose set forth.

3. In a milling-machine, in combination, the base-plate $a$, suitably supported and provided with a groove, $c$, a carriage, $d$, fitted into the groove, an arbor, $f$, journaled upon the said carriage and carrying a rotary cutter and a worm-wheel, $h$, the nut $q$, provided with a central opening having a screw-thread and having on its periphery worm-gear teeth engaging with the worm-wheel $h$, the brackets $s$ $s$ upon each side of the nut and secured to the carriage, a feeding-screw, $j$, passed through the said opening in the nut, the brackets $k$ and $l$, secured to opposite ends of the bed-plate and carrying the screw, and devices, as the cap-piece $o$ and screw $p$, for retaining said feeding-screw against revolution, substantially as and for the purpose set forth.

4. In a milling-machine, the combination, with a base-plate, $a$, provided with a groove, $c$, the carriage $d$, fitted into the groove and carrying a cutter-arbor and rotary cutter, a worm-wheel, $h$, upon the arbor, a cylindrical nut provided with a threaded central opening, and a feeding-screw, $j$, passed through and engaging with the nut $q$ and journaled to supporting-brackets, of a table, $t$, provided with a vertical apron, $u$, having vertical slots $w$, and secured to the column by the bolts $v$, passed through the said slots and into the column, and the lugs $x$, projecting outwardly from the column and provided with the adjusting-screws $y$, and the set-screws $z$, passed through threaded openings in the apron and against the column, substantially as and for the purpose set forth.

In testimony whereof I affix my signature in presence of two witnesses.

JOHN A. GREGG.

Witnesses:
W. H. POWER,
JAS. E. THOMAS.